(12) United States Patent
Ramos et al.

(10) Patent No.: US 9,205,325 B2
(45) Date of Patent: Dec. 8, 2015

(54) PRIZE-BASED DIGITAL ADVERTISING SYSTEM

(71) Applicant: Priatek, LLC, St. Petersburg, FL (US)

(72) Inventors: Jeremy Ramos, Tampa, FL (US); Milind S. Bharvirkar, Odessa, FL (US)

(73) Assignee: Priatek, LLC, St. Petersburg, FL (US)

( * ) Notice: Subject to any disclaimer, the term of this patent is extended or adjusted under 35 U.S.C. 154(b) by 64 days.

(21) Appl. No.: 14/020,889

(22) Filed: Sep. 8, 2013

(65) Prior Publication Data

US 2014/0073410 A1 Mar. 13, 2014

Related U.S. Application Data

(60) Provisional application No. 61/698,605, filed on Sep. 8, 2012.

(51) Int. Cl.
*A63F 9/24* (2006.01)
*A63F 13/00* (2014.01)
*G06Q 30/02* (2012.01)
*G07F 17/32* (2006.01)

(52) U.S. Cl.
CPC ............ *A63F 13/00* (2013.01); *G06Q 30/0209* (2013.01); *G07F 17/3255* (2013.01)

(58) Field of Classification Search
CPC ........... G07F 17/323; A63F 2300/5506; A63F 13/00; G06Q 30/0212; G06Q 30/0251; G06Q 30/0277; G06Q 30/0239; G06Q 30/0241
See application file for complete search history.

(56) References Cited

U.S. PATENT DOCUMENTS

| 2003/0186732 | A1* | 10/2003 | Viglione | 463/7 |
|---|---|---|---|---|
| 2006/0063587 | A1* | 3/2006 | Manzo | 463/25 |
| 2007/0174121 | A1* | 7/2007 | Plotkin et al. | 705/14 |
| 2012/0059699 | A1* | 3/2012 | Zhou et al. | 705/14.12 |
| 2013/0029762 | A1* | 1/2013 | Klappert | 463/31 |
| 2013/0339111 | A1* | 12/2013 | Ross et al. | 705/14.12 |

* cited by examiner

*Primary Examiner* — Steve Rowland
(74) *Attorney, Agent, or Firm* — Buchanan Ingersoll & Rooney PC

(57) ABSTRACT

Systems and methods can support a prize-based digital advertising system. The system can receive advertising material associated with an offering from an advertiser. The advertising materials may be presented on one or more public display devices associated with a client system. Game play opportunities associated with the advertising material and the offering may be presented on the one or more public display devices. The client system can support game play by a user at the one or more public display devices. The user may be provided with a discount towards purchasing the offering. The user may also be provided the offering as a prize in response to achieving specified game play performance such as winning or placing within a tournament.

20 Claims, 5 Drawing Sheets

100 PRIZE-BASED DIGITAL ADVERTISING SYSTEM

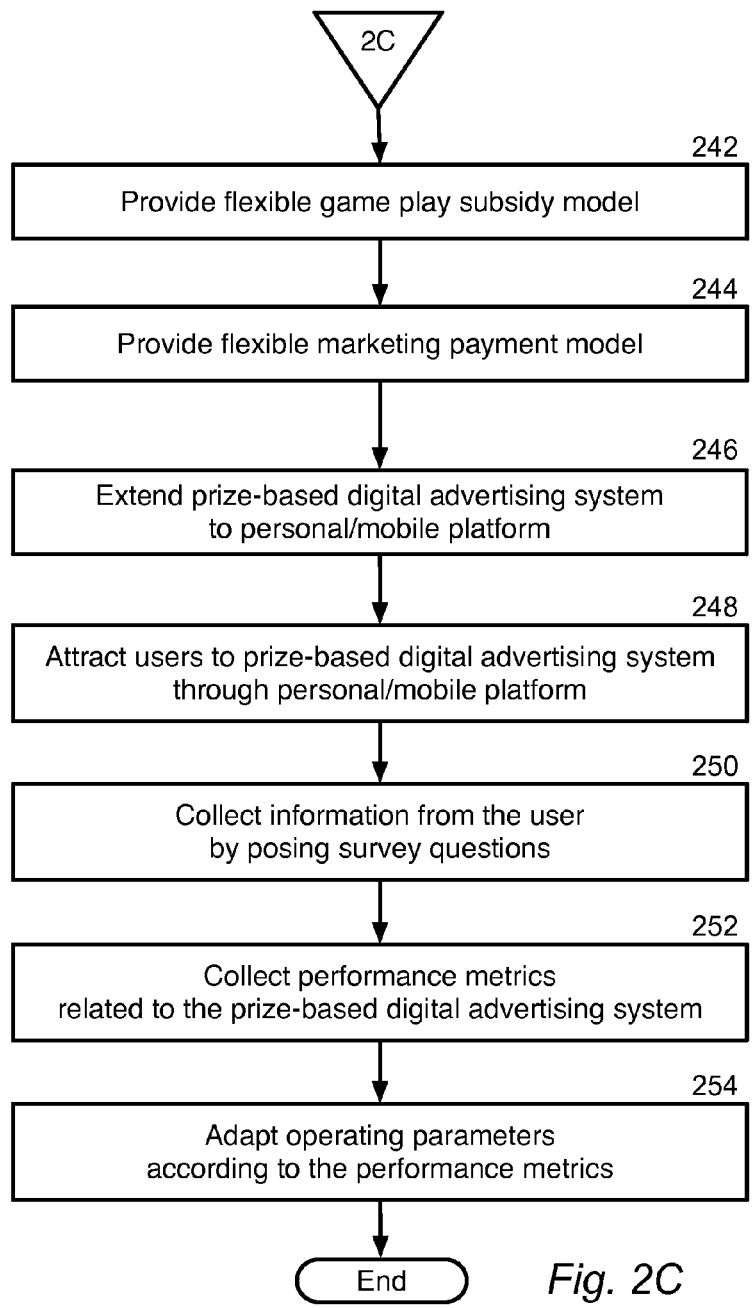

PRIZE-BASED DIGITAL ADVERTISING SYSTEM

RELATED APPLICATION

This application claims priority to U.S. Provisional Patent Application No. 61/698,605, filed Sep. 8, 2012 and entitled "Skill-Based Game Marketing and Advertising System." The complete disclosure of the above-identified priority application is hereby fully incorporated herein by reference.

BACKGROUND

Traditional signage or passive advertising is often quite easy to tune out or ignore. Consumers are bombarded with so much advertising material in any given day that it is impossible for them to pay attention to all of it. Traditional signage or passive advertising does not engage the consumer in a participatory fashion. For example, a consumer generally cannot walk up to signage or passive advertising and interact with it. Consumers cannot provide information or express interest with a traditional sign in exchange for a chance to win, or obtain a discount on, the product being advertised.

There is traditionally no way for advertisers to detect or track consumer interest or reactions to traditional signage or other forms of passive advertising, because consumers do not interact with such advertisements. Similarly, brokers of traditional advertising space or time cannot offer pricing based on an interest level similar to how online advertising can charge for impressions, clicks, or actual purchases completed.

There is a need in the art for advertising or signage systems effective for engaging consumers in a participatory fashion. There is a further need for advertisers to detect or track consumer interest or reactions to signage and similar advertising.

SUMMARY

In certain example embodiments described herein, methods and systems can support a prize-based digital advertising system. The system can receive advertising material associated with an offering from an advertiser. The advertising materials may be presented on one or more public display devices associated with a client system. Game play opportunities associated with the advertising material and the offering may be presented on the one or more public display devices. The client system can support game play by a user at the one or more public display devices. The user may be provided with a discount towards purchasing the offering. The user may also be provided the offering as a prize in response to achieving specified game play performance such as winning or placing within a tournament.

These and other aspects, objects, features, and advantages of the example embodiments will become apparent to those having ordinary skill in the art upon consideration of the following detailed description of illustrated example embodiments.

BRIEF DESCRIPTION OF THE DRAWINGS

FIGS. 2A-2C are block flow diagrams depicting a method for prize-based digital advertising in accordance with one or more embodiments presented herein.

DETAILED DESCRIPTION OF EXAMPLE EMBODIMENTS

Overview

Figure 1:
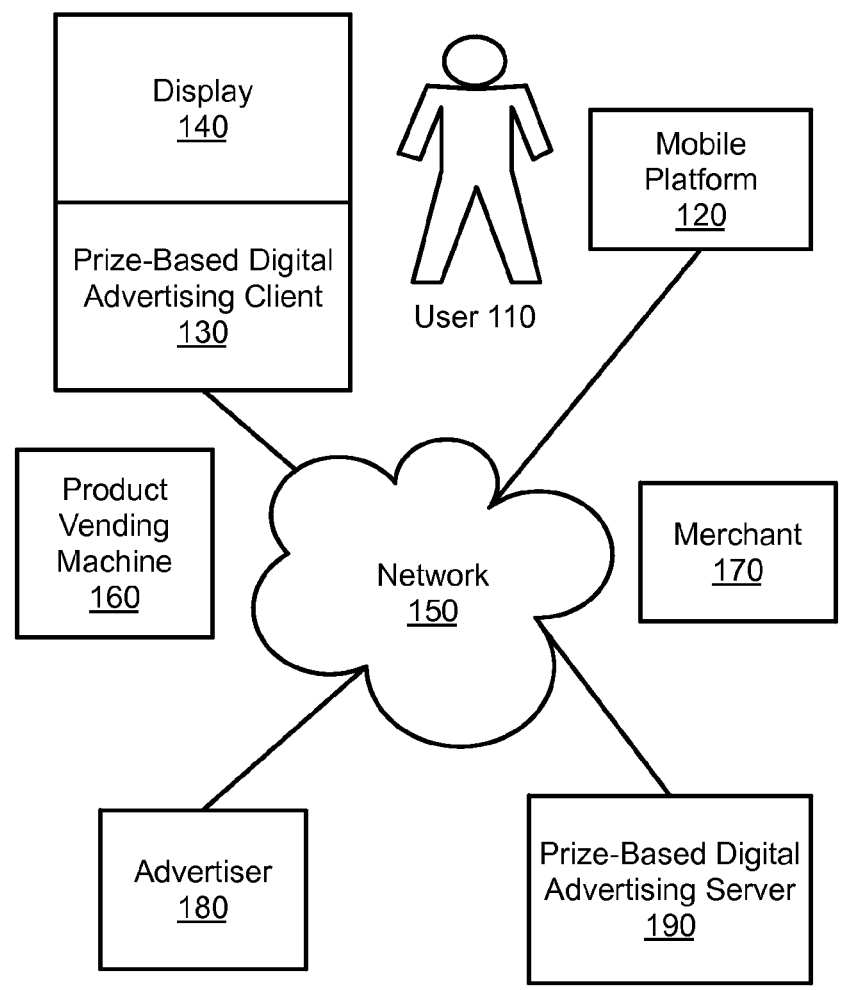
FIG. 1 is a block diagram depicting a prize-based digital advertising system in accordance with one or more embodiments presented herein.

The methods and systems described herein enable a prize-based digital advertising system. A prize-based digital advertising client, associated with a prize-based digital advertising server, can display advertising for a product and offer users an opportunity to play games to win the product as a prize or secure a discount for the purchase of the product. The advertising presentation and game play may occur on a large-format, public video display system placed in high-traffic or high-visibility locations to maximize public exposure. The system can host numerous games and game tournaments. The games may be skill-based. The games may be geared toward target market demographics for the particular product being advertised. During game play users may be presented with survey questions relevant to the product or to their target market demographic. The games may be played in a tournament format to encourage additional game play and thus additional opportunities to advertise to the users and to query the users with survey questions. Through game play or tournament participation, users may win the product as a prize. The users may also be offered a discount or coupon for the product. The amount of the discount may be allocated through a randomized sweepstake. Offers or coupons may be tailored to the user based on information collected from their survey responses. Discounts may be redeemed at local merchants or by purchasing the product directly through the system. Direct purchases may be fulfilled by home delivery or dispensed through a vending machine mechanism associated with the system.

Providers of products and marketing professionals can leverage the prize-based digital advertising system to both deliver advertising and collect marketing data. Interaction with users can quantify that the user is aware of the product, that the user is interested in the product, and how interested the user may be in purchasing the product.

Many consumers enjoy playing games, and the demographics of gamers are well understood. This information can be used to create the game-playing and tournament environments of the prize-based digital advertising system. Consumers enjoy the opportunity to win prizes, and they typically will pursue prizes that are representative of their needs or wants. This phenomenon increases the potential of the prize-based digital advertising system to address the marketing and advertising needs of product and service providers. Presenting consumers with an engaging call to action that is relevant to them, and doing so in a compelling way that will garner their attention and action, can be a very effective approach to advertising.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

FIG. 1 is a block diagram depicting a prize-based digital advertising system 100 in accordance with one or more embodiments presented herein. The prize-based digital advertising system 100 can display advertising material related to a product from an advertiser 180. A user 110 may be presented with an opportunity for game play at a prize-based digital advertising client 130. The prize-based digital advertising client 130 may incorporate a display 140 for presenting the advertising material and offering game play. The user 110 can play a game for the prospect to win the product as a prize or secure a discount for the purchase of the product. The product, awarded as a prize or purchased at a discount, may be shipped to the user 110, delivered by a product vending machine 160, or picked up at a merchant 170. One or more prize-based digital advertising clients 130 may be coordinated from a prize-based digital advertising server 190. The user 110 may also participate in the prize-based digital advertising system 100 from a mobile platform 120 associated with the user 110. Computer-based subsystems of the prize-based digital advertising system 100 such as the prize-based digital advertising client 130, mobile platform 120, prize-based digital advertising server 190, or others may be in communication with one another via a network 150.

The prize-based digital advertising client 130 may be implemented as a kiosk, a wall-mounted device, a freestanding unit placed on the ground, or any other computer-based system having the necessary displays 140, user interfaces, and communications interfaces. The prize-based digital advertising client 130 may have multiple displays 140. One or more of the displays 140 may include touchscreen technology. For example, the advertising material offering the product as a prize for game play may be shown on an ultra-bright, high-definition display 140 that is several feet across. The user 110 may utilize multitouch-screens or 3D camera to interact with the prize-based digital advertising client 130. One or more cameras, other visual sensors, thermal sensors, or motion sensors, may be used for motion input or human gesture recognition functionality for input from the user 110. One or more microphones, or other audio sensors, may be used to support voice recognition functionality for input from the user 110. The prize-based digital advertising client 130 may be operable to deliver a smell or scent associated with the product or displayed advertising materials. The prize-based digital advertising client 130 can incorporate one or more displays 140 such as LCD, panels LED panels, plasma panels, projectors, CRT displays, and other display technology, or any combination thereof. The one or more displays 140 are generally placed in a public setting to attract users and therefore may be referred to as public display devices.

The prize-based digital advertising client 130 can offer one or more games for play by the user 110. The games may be stored in a library of games associated with the prize-based digital advertising client 130 or the prize-based digital advertising server 190. The games may be skill-based, games of chance, puzzle games, arcade games, video games, adventure games, strategy games, role-playing games, or any other type of game. The prize-based digital advertising client 130 may support a game platform where various games may be installed into the system while operating in the field, for example over the network 150. According to one or more embodiments, the game play can occur on the prize-based digital advertising client 130 and/or the game may be launched, or downloaded, to the mobile platform 120 for play.

Game play on the prize-based digital advertising client 130 may be single play, cumulative, or tournament model. The user 110 may play one or more games in an attempt to win a prize of the product being advertised by the prize-based digital advertising client 130. In addition to winning the product as a prize, the user 110 may also play for a sweepstakes chance at a discount off of purchasing the product. According to one or more embodiments, users 110 may earn loyalty tokens such as points, badges, or rings. Such loyalty tokens may accumulate over multiple plays. A user 110 may be allowed access to special games or tournaments for achieving specified loyalty tokens. Advertisers 180 may sponsor these special games or tournaments.

While the term "product" is used herein as associated with the advertising materials and the game prizes, it should be appreciated that the product may actually be a product, a collection of products, a subscription, a service, media, software, licenses, any other goods, any other services, or any combination thereof. For example, the product may be, or include, movies, televisions shows, DVDs, CDs, music, software, tickets or games. According to one or more embodiments, the product may actually be the game played on the prize-based digital advertising client 130 itself. For example, the prize-based digital advertising client 130 may offer play on a limited or sample version of the game and the product being advertised is the game itself. According to one or more embodiments, the prize may be a monetary award, cash, money, a specified cash flow, precious metals, credits, gift cards, or any other placeholders of value.

The mobile platform 120 may be a personal or mobile computer, smartphone, or other computing machine associated with the user 110. The user 110 can use software or applications on the mobile platform 120 to participate with the prize-based digital advertising system 100 even when they are not physical present at the prize-based digital advertising client 130. The mobile platform 120 may be considered an extension of the prize-based digital advertising client 130. According to one or more embodiments, the mobile platform 120 may provide a mobile and/or miniaturized prize-based digital advertising client 130 for use on an airplane, trail, ship, elevator, hotel room, or other environment suitable to a reduced form factor version of the prize-based digital advertising client 130.

The prize-based digital advertising server 190 may be a centralized computing system for coordinating a plurality of prize-based digital advertising clients 130. The prize-based digital advertising server 190 may serve as a repository for advertising material, games, and tournament information to be served to the plurality of prize-based digital advertising clients 130. Moreover, the prize-based digital advertising server 190 may serve as a repository for user information, survey results, marketing data, and tournament information to be collected from the plurality of prize-based digital advertising clients 130.

The advertiser 180 may be any individual or organization wishing to advertise a product through the prize-based digital advertising system 100. For example, the advertiser 180 may be a manufacturer, a vendor, a marketing company, or any other advertiser of goods and/or services. The prize-based digital advertising server 190 can provide an interface for the advertiser 180 to configure advertising campaigns and associated prizes, discounts, tournaments, and sweepstakes. The advertiser can also upload their advertising materials to the prize-based digital advertising server 190. The advertising materials may include graphics, video, animations, music, audio, text content, and various other media elements. The prize-based digital advertising server 190 can provide an interface for the advertiser 180 to retrieve marketing information, campaign results, survey results, and other information from the prize-based digital advertising system 100.

The product vending machine 160 can provide direct and immediate fulfillment of products from the prize-based digital advertising client 130. The product vending machine 160 can dispense products that are awarded as prizes as well as products that are purchased through the prize-based digital advertising client 130. The product vending machine 160 may be physically connected to one or more prize-based digital advertising clients 130. The product vending machine 160 may also be in communication with one or more prize-based digital advertising clients 130 via the network 150, a wireless interface, a direct electrical interface, or so forth. According to one or more embodiments, the user 110 can play a series of games to collect points. A certain number of points may earn the user a reward such as a stuffed animal, toy, or any other merchandise. The reward may be shipped to the user 110, picked up at a store, dispensed from a vending machine, or otherwise provided to the user 110.

The merchant 170 can provide fulfillment of products associated with the prize-based digital advertising client 130. The merchant 170 can provide products that are awarded as prizes as well as process discounts on products associated with coupons or sweepstakes obtained through the prize-based digital advertising client 130. The prize-based digital advertising client 130 can provide a voucher for the purchase of the product. The voucher may be provided as a printed receipt, via email, or as an electronic token such as a code, barcode, or message. The merchant 170 can verify the purchase and fulfill the order by verifying the voucher with a receipt, code, barcode, QR code, or token. The verification may occur through an online browser, application, or other software module.

The merchant 170 or a retail location associated with the prize-based digital advertising client 130 can offer free (or otherwise incentivized) game play. Such incentivized play may be provided with the purchase of a product or service. Incentivized play may be issued to encourage playing for a specified product or in conjunction with a specified advertisement. Incentivized play may be issued via any electronic mechanism or through a code, barcode, or QR coder on a receipt from a purchase. A merchant 170, retailer, or client location may use incentivized play to associate the customer with their identity as a user 110 on the prize-based digital advertising client 130 thereby coupling the user 110 with their retail purchases or other activities.

It should be appreciated that the prize-based digital advertising client 130 may also provide various information or transactions to the user 110. For example, the prize-based digital advertising client 130 may offer tickets for sale to movies, sporting events, museums, amusement parks, tours, or other attractions. Similarly, mobile apps, digital games, music, videos, or other media may be purchased or downloaded from the prize-based digital advertising client 130.

Figure 3:
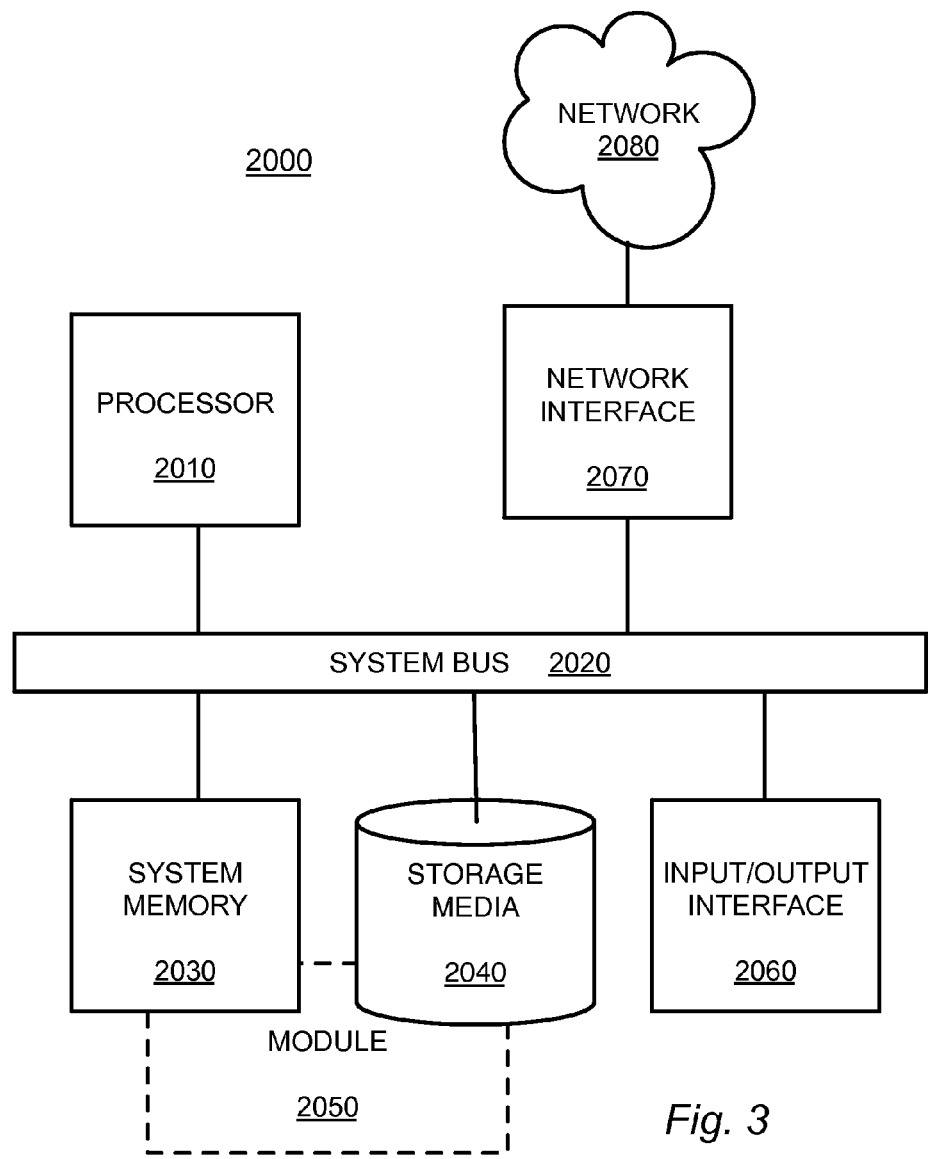
FIG. 3 is a block diagram depicting a computing machine and a module in accordance with one or more embodiments presented herein.

The prize-based digital advertising client 130, the mobile platform 120, the prize-based digital advertising server 190, and any other computing machines associated with the technology presented herein may be any type of computing machine such as, but not limited to, those discussed in more detail with respect to FIG. 3. Furthermore, any modules associated with any of these computing machines or any other modules (scripts, web content, software, firmware, or hardware) associated with the technology presented herein may by any of the modules discussed in more detail with respect to FIG. 3. The computing machines discussed herein may communicate with one another as well as other computer machines or communication systems over one or more networks such as network 150. The network 150 may include any type of data or communications network including any of the network technology discussed with respect to FIG. 3.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 2A:
Figure 2B:
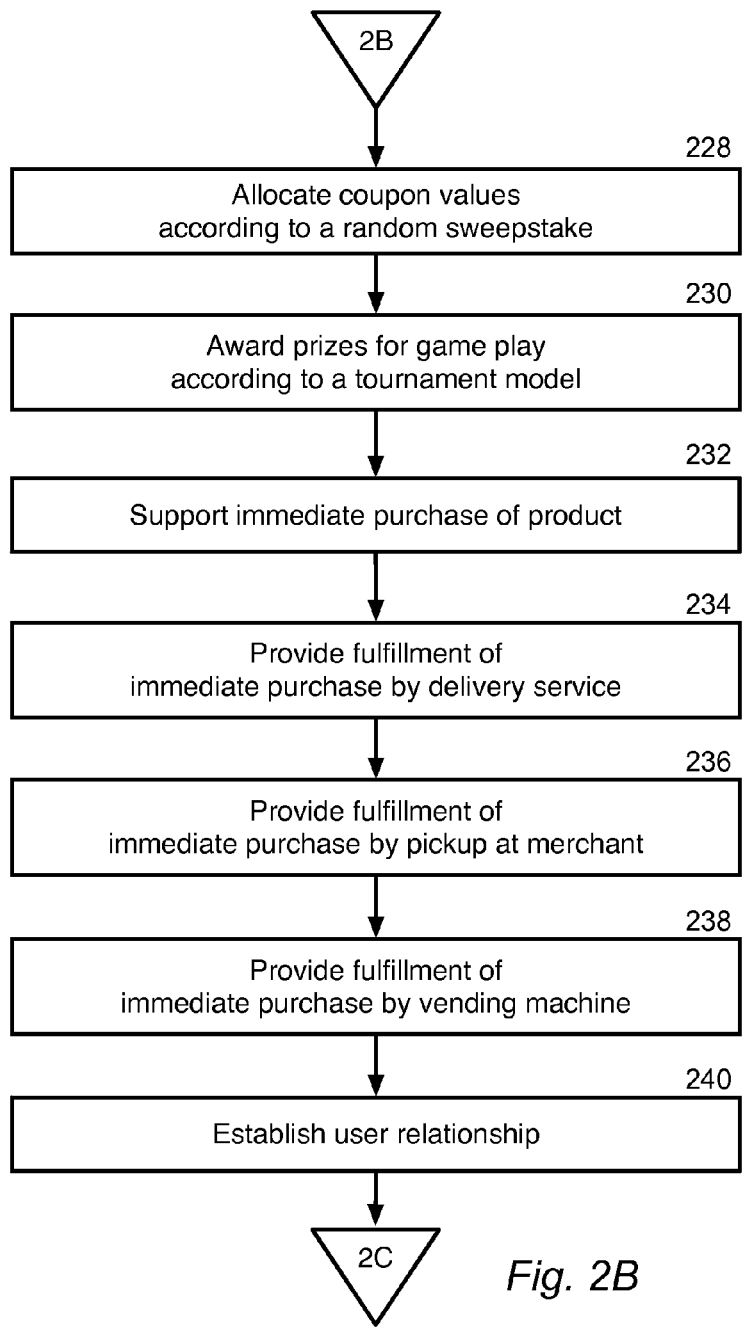

FIGS. 2A-2C are block flow diagrams depicting a method 200 for prize-based digital advertising in accordance with one or more embodiments presented herein.

In block 210, the advertiser 180 can provide initial operating parameters to the prize-based digital advertising system 100 for their prize-based digital advertising campaign to promote their products and services. Parameters for an advertising campaign may include budget, prizes, game types, coupon sweepstake ranges, survey questions, fee models, and so forth. The advertiser 180 may pay per impression, per customer lead, per acquisition/sale, a flat fee (e.g. per tournament, or monthly), or by some other arrangement. According to one embodiment, impressions may be free and the advertiser 180 only charged for the number of times a user 110 plays a game in hopes to win the prize. Generally, goals for the advertiser 180 and/or the merchant 170 may include generating customer traffic to the advertiser 180 and/or the merchant 170 and closing sales of the product being advertised. Tournament play may be determined according to several parameters including ranges of dates/times, locations, tournament type, prizes, coupons, rules, and so forth. Advertisers 180 may pay up-front for a specific number of game play events by users 110. Alternatively, advertisers 180 may be automatically billed when game play numbers hit certain pre-determined budget.

In block 212, the advertiser 180 can provide advertising material to the prize-based digital advertising system 100 for the prize-based digital advertising campaign. The primary creative advertising material is the ad to be displayed on the display 140 associated with the prize-based digital advertising client 130. For prize-based digital advertising clients 130 having multiple displays 140, different advertising material or content may be placed on individual displays 140 at various times. For example, prize-based digital advertising clients 130 having dual displays 140 may present different advertising material on the upper and lower displays 140. Advertising content development say also include creative advertising materials for flyers, web, mobile applications, social media, and so forth.

In block 214, a game platform may be supporting on the prize-based digital advertising client 130. The game platform may support a library of games. The games, similar games, or a subset thereof, may also be made available for the mobile platform 120. The games may include single-player, multi-player, arcade style, puzzles, trivia, sports, first person shooter, strategy, adventure, simulation, physics, any other type of games, or any combinations there of. The games may be games of skill where the highest score or combination of scores wins. The games may be games of chance. The games may include instant winner sweepstakes where users 110 are issued a random coupon during or at the end of game play. The games may include sweepstakes where the winning user 110 is drawn at the end of a tournament, or identified upon achieving a specific result after multiple game plays. The game platform may allocate a revenue portion to developers of the games thereby supporting a model for game developer to monetize their games.

In block 216, advertising material for a product may be presented on a display 140 associated with the prize-based digital advertising client 130. The presentation can attract users 110, in public places, to the prize-based digital advertising client 130 by offering advertised products as prizes for game play. The users 110 may view these prize advertisements in a positive light, because they are being shown something they can win rather than a regular ad that merely seeks to sell them something. Many users 100 who may sub-consciously tune-out normal ads, may be interested in an offer to win a product they are interested in. Placed in a retail environment (e.g. a shopping center, mall, airport, hotel lobby, etc.), the prize-based digital advertising client 130 can attract users 110 as customer and generate multiple income streams. Users 110 may be drawn to the location for game play (especially tournament play) with the prize-based digital advertising client 130 through notifications or announcements via emails, mobile alerts, text messages, flyers, invitations, word of mouth, clubs, groups, organizations, social media, blogs, microblogs, meeting websites, invitation websites, online notifications, and so forth. According to some embodiments, users 110 can be notified that their ranking or standings fell in a tournament or other game play. Such notification may entice the users 110 back to a retail location or other business to continue play and improve their standing.

In block 218, the prize-based digital advertising client 130 can offer game play to the user 110 where the advertised product is a prize. Users 110 winning at tournament play may be awarded a prize of the product that was being advertised on the prize-based digital advertising client 130. A single grand prize, or multiple prizes may be awarded. Prizes may be awarded for achieving the highest score, to the top scoring users 110 (for example, ten highest scores), by random chance, or various other mappings of prizes to specified game play performance.

In block 220, the prize-based digital advertising system 100 can register that a user 110 is interested in the advertised product from the fact that the user 110 selected the product to play for as a game prize.

In block 222, the user 110 can play a game at the prize-based digital advertising client 130. A specific game may be specified by the advertiser 180 or by the prize-based digital advertising system 100. Alternative the game may be selected for game play by the user 110 from a library of games.

In block 224, the prize-based digital advertising client 130 may continue to display advertising material simultaneous with supporting game play by a user 110. This simultaneous display support may be particularly supported by the prize-based digital advertising clients 130 having more than one display 140 or a single large-format display 140.

In block 226, the user 110 may be provided with a coupon for a discount towards the product being advertised by the prize-based digital advertising client 130. The user 110 may engage in game play at the prize-based digital advertising client 130 in hopes of winning the product being advertised. Even if the user 110 does not win the product as a prize for game play, the user 110 can be provided with a discount coupon to purchase the product. The coupon may be immediately issued from a printer associated with the prize-based digital advertising client 130. Alternatively, the prize-based digital advertising client 130 may issue the coupon to the user 110 via email, smartphone, mobile app, or some other electronic format. The product may be purchased directly from a computer or smartphone (such as the personal/mobile platform 120) to which the coupon is issued. For example, the coupon for a discount towards the product being advertised may be issued to the personal/mobile platform 120 where a "buy it now" or "immediate purchase" option (such as a button) is displayed. This immediate purchase functionality may operate similarly to the discussion with respect to block 232 below.

In block 228, the prize-based digital advertising system 100 can allocate coupon values according to a random sweepstake. The coupons may be those discussed with respect to block 226. Such discounts and/or promotions are typically awarded as coupons during or at end of game play. The coupons may be awarded randomly through a sweepstake model. For example, there may be a specified distribution of coupons ranging in discounts from 10% off to 90% off. It should be understood that a random sweepstake might also be referred to as a free game of chance promotion. A pre-determined number of each coupon value may be established prior to the start of each advertising campaign or game play tournament. The coupons may be dispersed such that all users 110 are winners, wherein a user not receiving the product as a prize may receive a randomly valued coupon for a discount off of purchasing the product.

Sweepstake games may require a free game play option with no purchase necessary. In such an instance, the user 110 may be able to mail in a postcard entry or make an online entry via the Internet or mobile application. Sweepstakes may be regulated by, and require registration with, various local authorities.

In block 230, the prize-based digital advertising system 100 may award prizes for game play according to a tournament model. For example, a predetermined number of users 110 may be defined prior to start of the tournament to be rewarded with the prizes of the advertised product based on their tournament standings. Games may be played in a tournament format to encourage more game play and opportunities to target the users 110 with advertisements and ask them marketing survey questions.

A tournament may be defied to have an unlimited number of game plays for the duration of the tournament. Alternatively, a tournament may be defined to allow users 110 a limited number of game plays for the duration of the tournament. The tournament may include a single type of game or alternatively a plurality of games may be associated with each tournament.

Tournament standings may be based on a mathematically deterministic formula that combines each individual user's 110 score for each game play into a single measure for the entire tournament.

The tournament may include one or more game plays by a plurality of users 110 over a predetermined period of time. Users 110 may also play a single game during each game play. The rules for each game may be fixed for the duration of the tournament.

Users 110 may be required to pay a fee to participate in the tournament. Tournaments may be per machine, location, retailer, state, nation, and so forth. Tournaments may be specific to an individual prize-based digital advertising client 130, or to any number of specifically identified prize-based digital advertising clients 130 throughout the network. Tournaments may have a specific start time/date and a specific end time/date. Tournaments can run for hours, days, months, or any other span of time.

There may be various tournament types. A first tournament type may be referred to as a regular tournament where there can be both high-score winner(s) and discount coupon winners. High-score winners may be announced at the end of each tournament. There may be a grand prize winner, and/or multiple high-score winners. For example, the grand prize winner may win a bag of golf clubs, while the ten high-score winners may win a putter. Discount coupon winners would include all other users 110 in the tournament. The discount coupon winners may be randomly issued coupons. For example, twenty 90% off coupons may be issued, thirty 50% off coupons may be issued, and all remaining users 110 may receive 10% off coupons. A random coupon could be issued at each play, however each user 110 may be limited to using only one coupon depending upon specified redemption policies. A pre-determined number of coupons of each type may be established prior to the start of each tournament.

Another tournament type may be referred to as a limited time cumulative tournament where users can play only for a specified amount of time. The winning user 110 is the one to achieve the highest cumulative score possible in that time period.

Another tournament type may be referred to as a limited number of play cumulative tournaments where users 110 can play only up to a specified number of times, and the user 110 with the highest cumulative score wins.

Another tournament type may be referred to as a multi-game tournament where users 110 play a number of different games. The winner is the user 110 with the highest combined high-scores from all of their game play.

Another tournament type may be referred to as team-play cumulative tournaments where teams scores are combined. Winners are the teams with the highest cumulative scores.

In block 232, the prize-based digital advertising client 130 can support immediate purchase of product being advertised. If the user 110 had been awarded a discount coupon, the discount may be applied to immediately purchase the product from the prize-based digital advertising client 130. The prize-based digital advertising client 130 may offer incentives for making an immediate purchase. For example, the user 110 may be offered free accessories, gifts, services, or so forth if they make an immediate purchase. These incentives may only be offered for a limited time. For example, the incentives may only be available if the immediate purchase is made within a certain number of hours, days, or other specified time span.

In block 234, fulfillment of the advertised product may be provided by a delivery service. Shipping the product to the purchasing user 110 may fulfill the immediate purchase discussed with respect to block 232.

In block 236, fulfillment of the advertised product may be provided by pickup by the user 110 at a merchant 170. Picking up the product from a merchant 170 may fulfill the immediate purchase discussed with respect to block 232.

In block 238, fulfillment of the advertised product may be provided by a product vending machine 160 associated with the prize-based digital advertising client 130. Dispensing of the product from the product vending machine 160 may fulfill the immediate purchase discussed with respect to block 232.

In block 240, the prize-based digital advertising system 100 may establish a relationship with the user 110, for example through customer registration and profiles. Once registered, users 110 may use their user account or mobile application to log in to a prize-based digital advertising client 130. The mobile application may display a barcode, QR code, or other symbol which when pointed at a camera associated with the prize-based digital advertising client 130, can automatically log in the user 110.

A user 110 can build a customer profile so that advertising messages may be targeted to appropriate users 110. When users 110 play games to win prizes, they can optionally register an account to receive prizes, track discounts, and to keep a record of their gaming and tournament scores. As the user 110 interacts with the system, advertisements for products they are likely to be interested in are presented. Users 110 are also advertised opportunities to play additional games and tournaments to win prizes perpetuating their participation and furthering the opportunity to engage them with advertisements and marketing opportunities.

Marketing information that may be obtained from the user 110 may include user details such as age, gender, geographic location, and so forth. The marketing information may also include aggregate demographics of system users 110, as well as identification of products and prizes of interest to a consumer. The marketing information may also include answers to survey questions as discussed with respect to block 250 below.

In block 242, the prize-based digital advertising system 100 can support a flexible game play subsidy model where an advertising fee can subsidize game play such that play is discounted or free to the user 110.

For example, the prize-based digital advertising system 100 can charge advertisers per customer interaction. Traditionally, display advertising is billed monthly, with no promise of any results. The prize-based digital advertising system 100 can charge advertisers 180 on a pay-per-click (PPC) basis directly measuring customer interactions with its advertisements. The advertisers 180 may be charged only when a user 110 chooses to play a game to win the advertised product thereby supporting a results-based advertising model.

In block 244, the prize-based digital advertising system 100 can support a flexible marketing payment model. For example, the advertiser 180 may pay for a sale, pay for a lead, pay for a click, or pay for an impression. Additionally, the advertiser 180 may pay for survey answers, user information, or an established user relationship. As yet another example, the advertiser 180 may be charged only for game play to win their advertised product. Also, the advertiser 180 may be charged an extra fee for being for information on users 110 interested in their product. Advertisers 180 may bid to pay a higher fee in exchange for preferable placement or exclusivity on a particular prize-based digital advertising client 130 or within a geographic territory or location type.

In block 246, the prize-based digital advertising system 100 may be extended to a personal/mobile platform 120. Software or a mobile application on a personal computer, smartphone, or mobile device associated with the user 110 may serve as a portal between the user 110 and the prize-based digital advertising system 100. The portal may be used to mobilize an audience of users 110 to the prize-based digital advertising system 100.

The application or software can display the tokens or credits for game play associated with the user 110. Tokens may also be added using credit card purchase. The application or software can display discount coupons won by the user 110. The application or software can display scores and rankings on the games played by the user 110 or currently in progress. The application or software can support joining a trivia tournament at a prize-based digital advertising client 130.

In block 248, the personal/mobile platform 120 may be used to attract users 110 to prize-based digital advertising client 130. The application or software may let a user 110 play but then inform them with a message that they would have won a particular prize had they been playing at a prize-based digital advertising client 130.

In block 250, the prize-based digital advertising client 130 can collect marketing information from the user 110 by posing survey questions. The responses to specific survey questions can provide valuable marketing information about the product being advertised or those like it. This information may then used to target users 110 with advertisements tailored to their interests thereby increasing the relevance of the advertisements to each user.

In block 252, the prize-based digital advertising system 100 can collect performance metrics related to operation of the system. The results tracked may include tournament activity, popularity of certain games, effectiveness of certain advertisements, and various other types of operational and marketing information. The results tracked can provide advertisers 180 with live real-time statistics and results. Because specific ads can be tracked, the prize-based digital advertising system 100 may provide advertisers 180 with the ability to easily and accurately split-test different ads, with precise, real-time results, even on the same kiosk. This is not possible with traditional display advertising.

In block 254, the prize-based digital advertising system 100 can adapt operating parameters according to the performance metrics collected in block 252. The parameters for may include at least those discussed with respect to block 210, such as campaign budget, prizes, game types, coupon sweepstake ranges, survey questions, fee models, and so forth.

Example Systems

FIG. 3 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express ("PCIe"), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method comprising:
   providing at least one processor having computer-readable program code stored therein that, when executed by the at least one processor, causes the processor to perform the following method steps comprising:
   receiving, from an advertiser, advertising material at a prize-based digital advertising system where the advertising material is uploaded via an interface associated with an offering from the advertiser;

presenting the advertising material on one or more public video displays coupled to a prize-based digital advertising client associated with the prize-based digital advertising system, wherein the offering is tailored to a user on the prize-based digital advertising client;

presenting, on the one or more public video displays, game play opportunities where the offering is available as a prize;

simultaneously presenting the advertising material and supporting game play by the user on the prize-based digital advertising client by displaying the advertising material to encourage additional game play and generate additional opportunities to receive advertising material;

providing the prize to the user in response to the user achieving a specified level of game play performance;

presenting the advertising material, presenting the game play opportunities, and providing the prize in accordance with an advertising campaign configured by the advertiser through the interface, wherein configuring the advertising campaign includes providing operating parameters;

retrieving advertising material and/or advertising campaign data before, during, and/or after game play by the user and transmitting the advertising material data and/or the advertising campaign data to the advertiser via the interface; and generating and transmitting at least one of notifications and announcements to the user to encourage additional game play based on the advertising material data and/or advertising campaign data.

2. The computer-implemented method of claim 1, wherein the prize-based digital advertising client comprises a kiosk or digital signage platform.

3. The computer-implemented method of claim 1, wherein the game play opportunities comprise one or more games of skill.

4. The computer-implemented method of claim 1, further comprising providing the user with a discount towards purchasing the offering, wherein the discount towards purchasing the offering comprises a discount valued according to a random sweepstake.

5. The computer-implemented method of claim 1, further comprising supporting immediate purchase of the offering via the prize-based digital advertising client.

6. The computer-implemented method of claim 1, further comprising supporting immediate purchase of the offering and fulfillment of the offering via a vending machine associated with the prize-based digital advertising client.

7. The computer-implemented method of claim 1, further comprising establishing an account for the user associated with the game play.

8. The computer-implemented method of claim 1, further comprising presenting survey question to the user before, during, or after the game play.

9. The computer-implemented method of claim 1, further comprising supporting a flexible marketing fee model or a flexible game play subsidy model.

10. The computer-implemented method of claim 1, wherein achieving the specified level of game play performance comprises achieving a specified ranking within a game play tournament against other users.

11. A prize-based digital advertising system, comprising: one or more processing units, one or more public display devices, and one or more processing modules, wherein the prize-based digital advertising system is configured by the one or more processing modules to:

receive advertising material uploaded via an interface by an advertiser associated with an offering from an advertiser;

present the advertising material on the one or more public display devices;

present, on the one or more public display devices, game play opportunities associated with the advertising material and the offering, wherein the offering is tailored to a user engaging in the game play opportunities via the one or more public display devices;

simultaneously present the advertising material and support game play by the user by displaying the advertising material to encourage additional game play and generate additional opportunities to receive advertising material;

provide the offering to the user as a prize in response to the user achieving a specified level of game play performance;

present the advertising material, present the game play opportunities, and provide the offering in accordance with advertising campaigns configured by the advertiser through the interface, wherein configuring the advertising campaign includes providing operating parameters;

retrieve advertising material and/or advertising campaign data before, during, and/or after game play by the user and transmitting the advertising material data and/or the advertising campaign data to the advertiser via the interface; and generate at least one of notifications and announcements transmitted to the user to encourage additional game play based on the advertising material data and/or advertising campaign data.

12. The prize-based digital advertising system of claim 11, wherein the prize-based digital advertising client comprises a kiosk or digital signage platform.

13. The prize-based digital advertising system of claim 11, wherein the game play opportunities comprise one or more video games.

14. The prize-based digital advertising system of claim 11, wherein the prize-based digital advertising system is further configured by the one or more processing modules to provide the user with a discount towards purchasing the offering.

15. The prize-based digital advertising system of claim 11, wherein the prize-based digital advertising system is further configured by the one or more processing modules to support immediate purchase of the offering by the user.

16. The prize-based digital advertising system of claim 11, wherein the prize-based digital advertising system is further configured by the one or more processing modules to support immediate purchase of the offering and fulfillment of the offering via a vending machine associated with the prize-based digital advertising client.

17. The prize-based digital advertising system of claim 11, wherein the prize-based digital advertising system is further configured by the one or more processing modules to support establishing an account for the user associated with the game play.

18. The prize-based digital advertising system of claim 11, wherein the prize-based digital advertising system is further configured by the one or more processing modules to present survey question to the user before, during, or after the game play.

19. The prize-based digital advertising system of claim 11, wherein achieving the specified level of game play performance comprises achieving a specified ranking within a game play tournament against other users.

20. A computer program product, comprising:

a non-transitory computer-readable medium having computer-readable program code embodied therein that, when executed by one or more computing devices, perform a method comprising:

receiving advertising material associated with an offering uploaded via an interface from an advertiser;

presenting the advertising material on one or more public video displays coupled to a prize-based digital advertising client associated with a prize-based digital advertising system, wherein the offering is tailored to a user on the prize-based digital advertising client;

presenting, on the one or more public video displays, game play opportunities associated with the advertising material and the offering;

simultaneously presenting the advertising material and supporting game play by the user on the prize-based digital advertising client by displaying the advertising material to encourage additional game play and generate additional opportunities to receive advertising material;

providing the user with a discount towards purchasing the offering wherein the discount value is established according to a random sweepstake;

providing the offering to the user as a prize in response to the user achieving a specified ranking within a game play tournament against other users;

presenting the advertising material, presenting the game play opportunities, and providing the offering in accordance with advertising campaigns configured by the advertiser through the interface, wherein configuring the advertising campaign includes providing operating parameters;

retrieving advertising material and/or advertising campaign data before, during, and/or after game play by the user and transmitting the advertising material data and/or the advertising campaign data to the advertiser via the interface; and generating at least one of notifications and announcements transmitted to the user to encourage additional game play based on the advertising material data and/or advertising campaign data.

\* \* \* \* \*